United States Patent
Wolf et al.

(10) Patent No.: US 10,102,054 B2
(45) Date of Patent: Oct. 16, 2018

(54) ANOMALY DETECTION, ALERTING, AND FAILURE CORRECTION IN A NETWORK

(71) Applicant: Time Warner Cable Enterprises LLC, New York, NY (US)

(72) Inventors: Ethan Wolf, Aurora, CO (US); Craig Vanderborgh, Golden, CO (US); Phoenix Kwan, Broomfield, CO (US)

(73) Assignee: Time Warner Cable Enterprises LLC, St. Louis, MO (US)

( * ) Notice: Subject to any disclaimer, the term of this patent is extended or adjusted under 35 U.S.C. 154(b) by 78 days.

(21) Appl. No.: 14/924,218

(22) Filed: Oct. 27, 2015

(65) Prior Publication Data
US 2017/0116059 A1    Apr. 27, 2017

(51) Int. Cl.
*G06F 11/00* (2006.01)
*G06F 11/07* (2006.01)

(52) U.S. Cl.
CPC ........ *G06F 11/079* (2013.01); *G06F 11/0709* (2013.01); *G06F 11/0751* (2013.01); *G06F 11/0772* (2013.01)

(58) Field of Classification Search
CPC .................................................. G06F 11/079
See application file for complete search history.

(56) References Cited

U.S. PATENT DOCUMENTS 6,353,902 B1 * 3/2002 Kulatunge ............. H04L 41/06
714/47.3
7,647,530 B2 * 1/2010 Britt ..................... H04L 41/0631
714/43

(Continued)

*Primary Examiner* — Christopher S McCarthy
(74) *Attorney, Agent, or Firm* — Armis IP Law, LLC

(57) ABSTRACT

In furtherance of providing uninterrupted network service, a data analyzer engine in a network environment aggregates real-time feedback from multiple resources that collectively provide delivery of content to multiple subscribers in a network environment. According to one arrangement, the multiple resources are disposed along a network communication path between a content delivery source and the subscriber. Based on analyzing the aggregated real-time feedback from the multiple resources disposed along the network communication path, assume that the data analyzer engine detects occurrence of multiple anomaly conditions at a location in the network communication path. Each of the anomaly condition may or may not be representative of an actual network resource failure. In response to detecting first occurrence of the anomaly conditions, the data analyzer engine initiates generation of a notification to appropriate network management personnel indicating the occurrence of the detected anomaly condition. The network management personnel determine a root cause of the first occurrence of the detected anomaly conditions and provide feedback indicating the root cause and how to correct it. Subsequent to learning and recording a pattern of first detected anomaly conditions and the corresponding root cause, a data analyzer engine compares the learned pattern to future received real-time feedback. Upon detecting a match of the learned pattern to a future occurrence of a same set of anomaly conditions, the analyzer engine provides notification to network management personnel to address the network failure. The notification can include information indicating the likely root cause of the newly detected anomaly condition (which matches a pattern of the originally detected anomaly) as well as how to fix it.

27 Claims, 8 Drawing Sheets

(56) References Cited

U.S. PATENT DOCUMENTS

| | | | |
|---|---|---|---|
| 2006/0248118 A1* | 11/2006 | Curtis | H04L 43/0817 |
| 2008/0155346 A1* | 6/2008 | Britt | H04L 41/14 |
| | | | 714/43 |
| 2008/0183855 A1* | 7/2008 | Agarwal | H04L 41/0677 |
| | | | 709/223 |
| 2016/0147823 A1* | 5/2016 | Noll | H04L 67/1097 |
| | | | 707/694 |
| 2016/0292028 A1* | 10/2016 | Gamage | G06F 11/079 |

* cited by examiner

ANOMALY DETECTION, ALERTING, AND FAILURE CORRECTION IN A NETWORK

BACKGROUND

In general, conventional techniques have been used to troubleshoot failures in a network environment. For example, a network service provider may provide network services to a number of subscribers. When the subscribers experience a failure, the subscribers typically communicate occurrence of the failure to the network service provider. Thereafter, the network service provider dispatches one or more entities to analyze the reported problem and take corrective action with respect to one or more identified failing resources.

BRIEF DESCRIPTION OF EMBODIMENTS

Conventional techniques of detecting and correcting different types of network failures suffer from deficiencies. For example, in many instances, such as in instances as discussed above, a service provider may wait for an error to be reported by a respective one or more subscribers in order to dispatch appropriate entities to correct the failure. This means that there can be a substantial delay between the time the failure actually occurs and a corresponding time when the failure is actually corrected. Additionally, it may be difficult to identify a root cause of a failure either due to its complexity or because the type of failure has never been seen before.

Embodiments herein deviate with respect to conventional techniques in order to reduce downtime of a network and corresponding data delivery services.

More specifically, one embodiment herein includes a data analyzer engine. In furtherance of providing uninterrupted a content delivery service, the data analyzer engine aggregates and processes real-time feedback received from multiple resources that collectively provide delivery of content to multiple subscribers in a network environment. In one embodiment, the multiple resources are disposed along a network communication path between a content delivery source and a downstream subscriber. Based on analyzing the aggregated real-time feedback from the multiple resources disposed along the network communication path, the data analyzer engine detects occurrence of one or more anomaly conditions (such as one or more conditions outside a normal set of operating conditions seen by the data analyzer engine) in the network environment. Note that the anomaly conditions may or may not be representative of an actual network resource failure.

In response to detecting the one or more anomaly conditions in the communication path, the data analyzer engine initiates generation of a notification to appropriate network management personnel indicating the occurrence of the detected anomaly conditions. If the anomaly conditions are found to represent a failure, based on detection of a root cause associated with the anomaly condition, the network management personnel identify a root cause of the anomaly condition.

In accordance with further embodiments, in addition to identifying first occurrence of an anomaly condition, the network management personnel enter information about the cause of the problem for the particular detected anomaly.

The anomaly engine as described herein uses this feedback loop to learn patterns of anomaly conditions that impact any of one or more different types of user experiences.

For example, in one embodiment, the anomaly engine records the pattern associated with a detected set of one or more anomalies and correlates the learned pattern information to a corresponding (underlying) root cause associated with the set of anomalies. Subsequent to correlating (mapping) learned patterns of anomalies to corresponding root causes, the anomaly engine applies the previously detected anomaly patterns to future received feedback data to detect occurrence of similar anomalies and identify corresponding root causes of those anomalies. In other words, the next time the anomaly engine detects occurrence of a learned pattern indicating the anomaly, based upon past training of identifying a particular anomaly and recording a likely root cause, the anomaly engine is able to immediately identify and trigger an appropriate alert indicating a likely root cause when the particular anomaly is detected.

Thus, in accordance with embodiments herein, the data analyzer engine can be configured to perform a preemptive analysis (to avoid occurrence of a failure or network outage) as opposed to reacting to a detected network outage. In certain instance, detected anomaly condition(s) may not in itself be a failure, but may indicate that a failure is about to occur. In such an instance, based on the anomaly conditions and application of previously learned anomaly patterns, the data analyzer engine detects conditions indicating a likelihood of a failure in the network communication path and provides corrective action.

In accordance with yet further embodiments, the data analyzer engine or other suitable resource proactively identifies the most likely root cause of the anomaly condition and notifies appropriate entities (such as maintenance personnel) to prevent occurrence of an anticipated or already-occurring failure in the network communication path.

Note that the anomaly condition can be detected in any suitable manner. For example, in one embodiment, to detect occurrence of an anomaly condition, the data analyzer engine analyzes feedback received from the multiple resources in the network communication path. As previously discussed, the data analyzer engine flags occurrence of the anomaly condition based on detecting that a pattern of a particular monitored metric (derived from the receives feedback) falls outside of a statistical norm. Such a condition indicates that a failure will occur or already did occur in the network.

In one embodiment, rather than notify all available maintenance personnel in the network of a detected anomaly condition, the data analyzer engine initiates forwarding of the detected one or more anomaly conditions, likely root cause, and identity of the corresponding network resource(s) to appropriate personnel that are assigned to fix or at least look into the detected set of identified one or more anomalies.

As a specific example, the data analyzer engine may detect occurrence of multiple anomaly conditions (including a first anomaly condition and a second anomaly condition) associated with different network resources in a communication path. The data analyzer engine can be configured to identify that the first anomaly condition is likely to be a root cause of the second anomaly condition. In such an instance, rather than providing notification of the second anomaly condition to a corresponding second personnel (who service a second set of network resources) in the network environment, the data analyzer engine initiates notification only to first personnel (who service a first set of network resources) regarding the first anomaly condition. Preventing notification of the second anomaly condition and corresponding root cause to the second personnel alleviates the second personnel from being dispatched to attempt to fix a non-root cause anomaly condition (i.e., the second anomaly condition and corresponding resource).

These and other more specific embodiments are disclosed in more detail below.

Note that any of the resources as discussed herein can include one or more computerized devices, servers, base stations, wireless communication equipment, communication management systems, workstations, handheld or laptop computers, or the like to carry out and/or support any or all of the method operations disclosed herein. In other words, one or more computerized devices or processors can be programmed and/or configured to operate as explained herein to carry out different embodiments of the invention.

Yet other embodiments herein include software programs to perform the steps and operations summarized above and disclosed in detail below. One such embodiment comprises a computer program product including a non-transitory computer-readable storage medium (i.e., any physical computer readable hardware storage medium) on which software instructions are encoded for subsequent execution. The instructions, when executed in a computerized device having a processor, program and/or cause the processor to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One or more embodiment includes a computer readable storage medium and/or system having instructions stored thereon. The instructions, when executed by computer processor hardware, cause the computer processor hardware of the system to: based on analyzing feedback from multiple resources disposed in a network environment, detect occurrence of a pattern of anomaly conditions associated with a first set of at least one resource in the network environment; associate the pattern to a type of root failure causing the multiple anomaly conditions; and utilize the pattern to identify a subsequent occurrence of the anomaly conditions in the network environment.

Note that the ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor, or within an operating system or a within a software application.

As discussed herein, techniques herein are well suited for processing feedback and identifying occurrence of an anomaly conditions in a communication path. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section and corresponding figures of the present disclosure as further discussed below.

Figure 1:
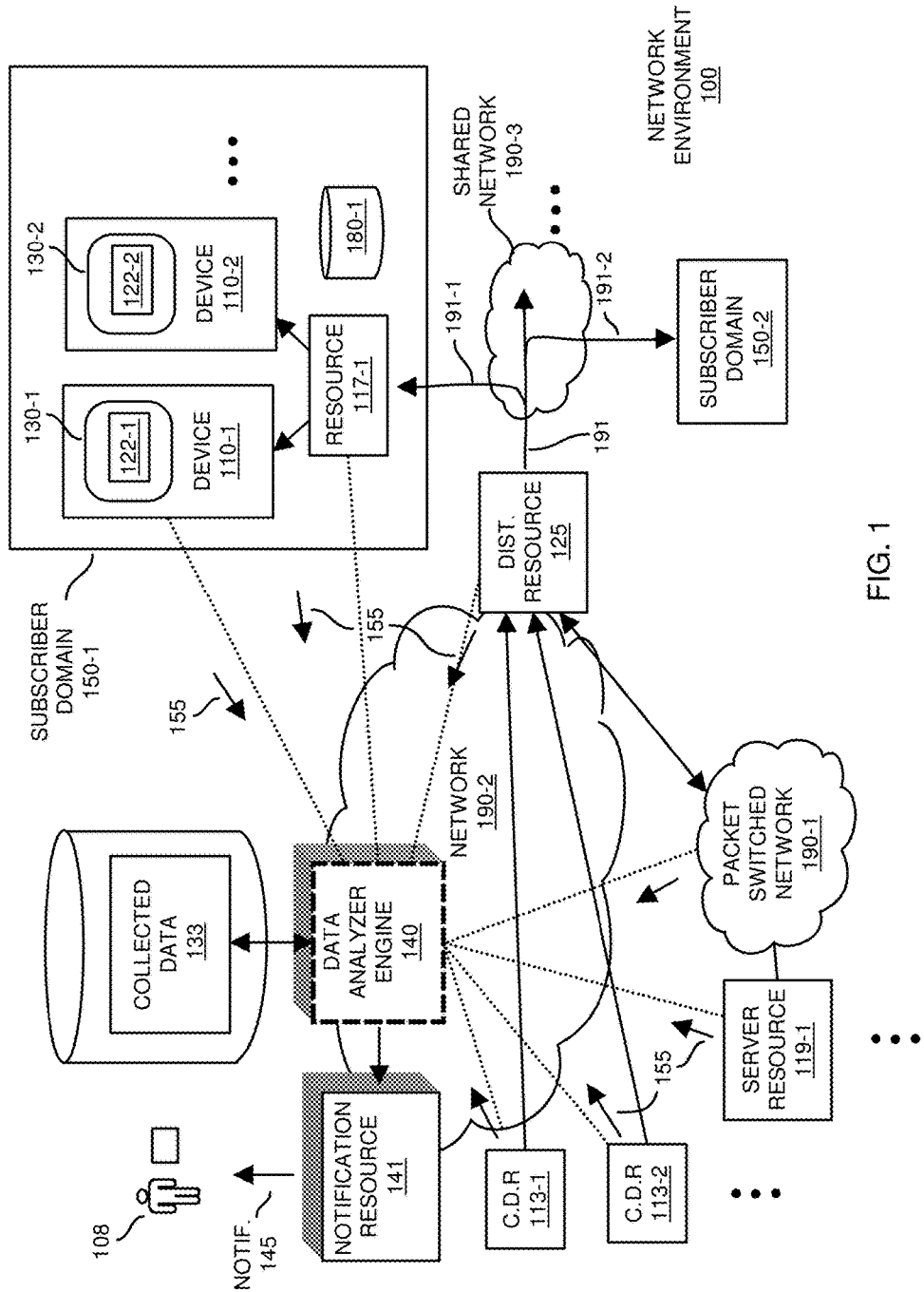
FIG. 1 is an example diagram illustrating a network environment including a data analyzer engine configured to collect and analyze feedback according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION AND FURTHER SUMMARY OF EMBODIMENTS

In furtherance of providing uninterrupted or less interrupted content delivery service, a data analyzer engine in a network environment aggregates real-time feedback from multiple resources that collectively provide delivery of content to multiple subscribers in a network environment. According to one arrangement, the multiple resources are disposed along a network communication path between a content delivery source and the subscriber. Based on analyzing the aggregated real-time feedback from the one or more resources disposed along the network communication path, assume that the data analyzer engine detects occurrence of an anomaly condition at a location in the network communication path.

In one embodiment, entities such as humans initially indicate which of multiple types of feedback parameters are important to monitor for anomalies. Note that the anomaly condition being analyzed may or may not be representative or caused by an actual network failure.

In response to detecting a set of one or more anomaly conditions, the data analyzer engine initiates generation of a notification to appropriate network management personnel indicating the occurrence of one or more detected anomaly conditions. Subsequent to being notified, the network management personnel analyze the set of anomaly conditions and determine whether a corresponding root failure is the cause of the anomaly. If it is determined that a failure occurred, and the root cause of the failure causing the anomaly is now known, network management personnel enter information about the cause of the problem for the particular set of detected one or more anomalies. The anomaly engine as described herein uses this feedback loop to learn and record patterns of anomaly conditions that impact user experience. Further, the anomaly engine correlates each of the learned patterns to a corresponding root cause.

Subsequent to correlating learned patterns of anomalies to corresponding root causes, the anomaly engine is then able to apply the anomaly patterns to future feedback data to identify future anomalies and corresponding root causes. For example, the next time the anomaly engine detects occurrence of the learned pattern, the anomaly engine maps the detected anomaly (as indicated by the corresponding pattern) to a corresponding root failure and provides notification that the corresponding root cause is a possible cause of the anomaly.

Now, more specifically, FIG. 1 is an example diagram illustrating a network environment according to embodiments herein.

As shown, network environment 100 (such as a content delivery network) includes multiple networks 190 including a packet-switched network 190-1, a core network 190-2, shared network 190-3, etc.

In general, via the different types of networks 190, respective subscribers and corresponding playback devices in respective subscriber domains 150 are able to retrieve and playback different types of content such as over-the-top content, scheduled broadcast content, video on-demand content, etc.

More specifically, as shown in this example, subscriber domain 150-1 includes multiple content playback devices 110-1, 110-2, etc. Each subscriber domain can include any of one or more playback devices to retrieve and play back content.

Further, in this example embodiment, playback device 110-1 includes display screen 130-1 and plays back a rendition of selected content 122-1; playback device 110-2 includes display screen 130-2 and plays back a rendition of selected content 122-2; and so on.

In addition to one or more playback devices 110 (including, playback device 110-1, playback device 110-2, etc.), subscriber domain 150-1 also includes resource 117-1 representing resources such as one or more set-top boxes, cable modems, WiFi™ networks, server resources, data router, etc.

As described herein, resource 117-1 (such as a gateway resource, cable modem, set top box, etc.) facilitates distribution of content to subscribers. For example, resource 117-1 facilitates distribution of content received over shared communication link 191 to the devices 110. Via communications through the resource 117-1 and over shared communication link 191 to distribution resource 125 (such as a cable modem termination system), each of the client devices 110 can initiate retrieval of content (such as video on demand content, over-the-top content, broadcast content, IPTV content, etc.). This can include transmitting requests for different segments of a stream of video content to play back the video content as a stream of data on a respective device.

Resource 117-1 can receive broadcast content (from content delivery resource 113-1, content delivery resource 113-2, etc.) transmitted over predetermined channels in shared networks 190-2, 190-3, etc. In such an instance, to play back broadcast content, the resource 117-1 tunes to one or more channels as indicated by users of devices 110-1.

In accordance with further embodiments, shared communication link 191 can be configured to support distribution of so-called over-the-top content as discussed above. For example, a portion of bandwidth in shared communication link 191 can support data channels in accordance with DOCSIS (Data Over Cable Service Interface Specification) or any other suitable communication standard.

In data communications, over-the-top content such as video, audio, etc., refers to receiving media over the Internet without the involvement of a system operator or service provider in the control or distribution of the content. In other words, an Internet service provider may be aware of content conveyed in data packets over a respective service flow. However, the service provider is not responsible for, nor does the service provider control use (such as display, redistribution, etc.) of the conveyed content at end user equipment.

Via the over-the-top data channels, each of the subscribers can retrieve over-the-top content from respective server sources disposed in packet-switched network 190-1 such as the Internet. As its name suggests, packet-switched network 190-1 in this example enables routing of data packets based on network address information.

By way of a non-limiting example, packet-switched network 190-1 can support client-server type communications. For example, a playback device in subscriber domain 150-1 can generate a request for content from a particular server resource such as server resource 119-1 using an appropriate network address of the server resource 119-1. In response to receiving the request for content, the server resource 119-1 transmits the requested content over packet-switched network 190-1 (as over-the-top content) to the respective client device in a subscriber domain using the network address of the client.

In one embodiment, cable network 190-2 supports services such as distribution of schedule or on-demand content via one or more cable television channels (e.g., QAM or quadrature amplitude modulated channels, IPTV channels, etc.) to subscribers in network environment 100.

As further shown, shared network 190-3 (such as a fiber-optic cable, coaxial cable, hybrid fiber-coaxial cable, etc.) supports final connectivity to subscribers or subscriber domains 150 and includes physical media such as one or more coaxial cables, optical fibers, twisted wire pairs, etc., to provide connectivity.

In accordance with further embodiments, each subscriber domain connected to the shared communication link 191 in shared network 190-3 is part of a respective service group that receives a same set of signals transmitted by distribution resource 125. Any of the devices in a given service group receiving respective channels can tune to the streaming content broadcasted over shared communication link 191. As previously discussed, other content transmitted over the shared communication link 191 such as over-the-top content may be specifically addressed to each of the playback devices.

As further shown, network environment 100 includes data analyzer engine 140. In one embodiment, data analyzer engine 140 receives feedback 155 (such as real-time feedback) associated with network resources and/or delivery of different types of content to multiple subscriber domains 150 in a cable network environment.

As shown, the feedback 155 can be received from any suitable resource. For example, in one embodiment, data analyzer engine 140 receives feedback from content delivery resource 113-1; data analyzer engine 140 receives feedback from content delivery resource 113-2; and so on.

In accordance with other embodiments, the data analyzer engine 140 (such as a management resource) aggregates and analyzes the real-time feedback 155 (stored as collected data 133) from multiple resources in network environment 100. The multiple resources collectively provide delivery of content to multiple subscribers.

As further discussed below, based on analyzing the aggregated real-time feedback 155 from the multiple resources, the data analyzer engine 140 detects occurrence of one or more anomaly conditions at respective one or more different locations in the network environment 100.

One way to detect anomaly conditions is to keep track of the history of feedback 155 received over time. The data analyzer engine 140 monitors and compares the newly received feedback 155 to relevant historical feedback. This can include comparing newly received feedback 155 to historical feedback received at roughly the same time of day that the newly analyzed feedback 155 is received, same time of week that the newly analyzed feedback 155 is received, etc.

For instances in which a pattern of the newly received feedback 155 (substantially) deviates with respect to the relevant historical feedback, the data analyzer engine 140 produces an alert indicating the anomaly condition. As previously discussed, in one embodiment, maintenance personnel (such as technicians) investigate the detected anomaly to identify if the anomaly condition occurred due to a corresponding root failure. If so, embodiments herein include recording the pattern and associating the pattern of detected anomaly condition to the corresponding root failure.

As further discussed herein, the data analyzer engine 140 analyzes the feedback 155 to identify occurrence of a particular pattern. In response to detecting occurrence of the one or more anomaly conditions with respect to the newly received feedback 155, the data analyzer engine 140 initiates generation of one or more notifications to provide corrective action with respect to the newly detected anomaly condition. The one or more notifications generated by the data analyzer engine 140 can indicate that the corresponding root failure associated with the particular pattern is possibly the cause of the newly detected anomaly condition.

Figure 2:
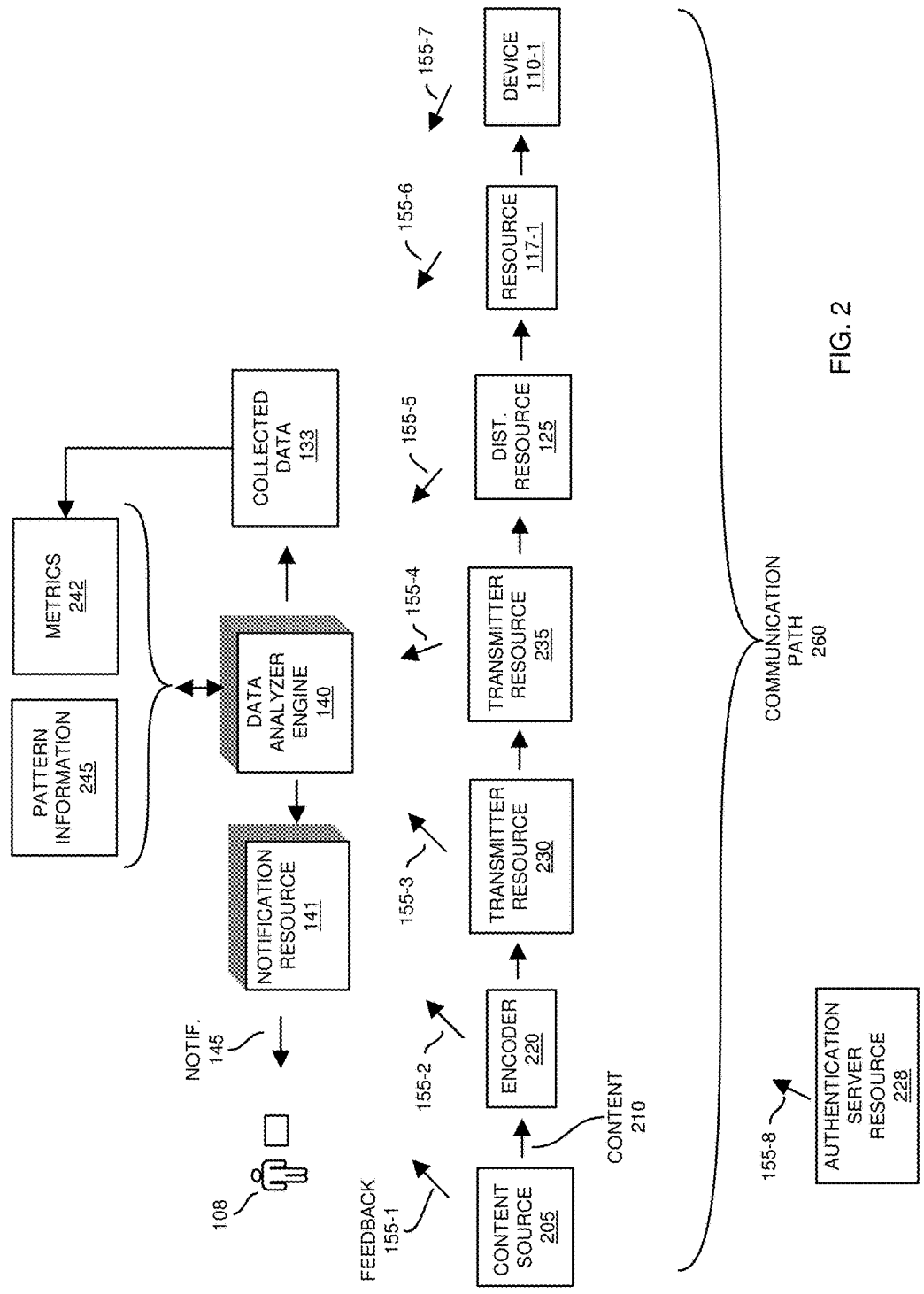
FIG. 2 is an example diagram illustrating a network communication path including multiple network resources according to embodiments herein.

FIG. 2 is an example diagram illustrating a network communication path including multiple network resources according to embodiments herein.

As shown, the communication path 260 in this example embodiment includes multiple resources facilitating delivery of different content to one or more subscribers in a network environment 100.

As a further example, the content 210 originating from content source 205 is made available for distribution over communication path 260. As previously discussed, content 210 can be any type of content such as video, images, audio, etc., encoded and distributed in any suitable manner.

Communication path 260 represents a series or parallel set of resources in network environment 100 that collectively provide delivery of content to subscribers.

As further shown, each of the multiple resources in the communication path 260 facilitates distribution of the content 210 to any of one or more end-user devices. For example, in this embodiment, content source 205 provides content 210 to encoder 220.

As its name suggests, the encoder 220 encodes the received content 210 for further distribution to transmitter resource 230. Transmitter resource 230, in turn, transmits the encoded content 210 to transmitter resource 235. Transmitter resource 235 forwards the encoded content 210 to distribution resource 125. Distribution resource 125 forwards the encoded content 210 to resource 117-1 disposed in subscriber domain 150-1. Resource 117-1 further transmits the encoded content 210 to the device 110-1 for storage and/or playback.

Accordingly, a combination of each of the resources in communication path 260 facilitates delivery of content 210 to one or more subscribers.

As previously discussed, and as further shown, in one embodiment, each of the multiple resources in the communication path 260 can be configured to provide corresponding feedback 155 to the data analyzer engine 140.

For example, the content source 205 provides feedback 155-1 to data analyzer engine 140; encoder 220 provides feedback 155-2 to data analyzer engine 140; transmitter resource 230 provides feedback 155-3 to data analyzer engine 140; transmitter resource 235 provides feedback 155-4 to data analyzer engine 140; distribution resource 125 (such as a cable modem termination system) provides feedback 155-5 to data analyzer engine 140; resource 117-1 (such as a cable modem, set top box, gateway resource, etc.) provides feedback 155-6 to data analyzer engine 140; device 110-1 provides feedback 155-7 to data analyzer engine 140; authentication server resource 228 provides feedback 155-8 to data analyzer engine 140; and so on.

One purpose of generating the feedback 155 from each of the resources (hardware, software, firmware, etc.) is to enable the data analyzer engine 140 to identify occurrence of an anomaly conditions (which may be a result of a failure or non-failure condition) with respect to such communication resources. For example, in one embodiment, the data analyzer engine 140 receives the specified feedback from the different resources in the communication path 260 (as well as many other communication paths in network environment 100). The data analyzer engine 140 stores the received feedback as collected data 133 in a respective repository. Further, the data analyzer engine 140 converts the received feedback 155 into respective metrics 242 representative of monitored parameters such as load, performance health of each of the resources, etc.

Thus, each of the metrics 242, derived from the aggregated real-time feedback 155, represents a measure of operational performance associated with the respective resource in the network communication path 260.

In such an instance, the data analyzer engine 140 receives a first set of one or more metrics via feedback 155-1; the data analyzer engine 140 uses the first set of one or more metrics to determine a health status of the content source 205 or related functionality provided by content source 205.

The data analyzer engine 140 receives a second set of one or more metrics via feedback 155-2; the data analyzer engine 140 uses the second set of one or more metrics to determine a health status of the encoder 220 or related functionality provided by the encoder 220.

The data analyzer engine 140 receives a third set of one or more metrics via feedback 155-3; the data analyzer engine 140 uses the third set of one or more metrics to determine a health status of the transmitter resource 230 or related functionality provided by transmitter resource 230.

The data analyzer engine 140 receives a fourth set of one or more metrics via feedback 155-4; the data analyzer engine 140 uses the fourth set of one or more metrics to determine a health status of the transmitter resource 235 or related functionality provided by transmitter resource 235.

The data analyzer engine 140 receives a fifth set of one or more metrics via feedback 155-5; the data analyzer engine 140 uses the fifth set of one or more metrics to determine a health status of the distribution resource 125 or related functionality provided by distribution resource 125.

The data analyzer engine 140 receives a sixth set of one or more metrics via feedback 155-6; the data analyzer engine 140 uses the sixth set of one or more metrics to determine the health of the resource 117-1 or related functionality provided by the resource 117-1.

The data analyzer engine 140 receives a seventh set of one or more metrics via feedback 155-7; the data analyzer engine 140 uses the seventh set of one or more metrics to determine the health of the device 110-1 or related functionality provided by the device 110-1.

The data analyzer engine 140 receives an eighth set of one or more metrics via feedback 155-8; the data analyzer engine 140 uses the eight set of one or more metrics to determine the health of the authentication server resource 228 or related functionality provided by the authentication server resource 228.

In this manner, the data analyzer engine 140 can be configured to receive status feedback (such as whether or not the respective resource is failing, healthy, etc.) from any number of resources associated with conveyance of content over the communication path 260 of network environment 100.

As previously discussed, the data analyzer engine 140 can be configured to continuously receive the feedback from the different resources in network environment 100. For example, the data analyzer engine 140 can be configured to continuously monitor the received feedback 155 in substantially real-time to determine occurrence of one or more anomalies in the network environment 100. Occurrence of respective one or more anomalies may indicate that a failure is imminent or has already occurred.

As further discussed below, in one embodiment, the anomaly detection as provided by data analyzer engine 140 is a replacement or supplement to conventional limit driven alerting. For example, according to one embodiment, the anomaly detection provided by data analyzer engine 140 looks for a trending of data values that fall substantially outside of a range of historical norms for that particular time of day and day of the week. If the difference between a current trend for a particular parameter relative to an historical norm for the particular parameter is statistically significant, it may indicate occurrence of an event of interest such as a network failure of one or more resources.

Figure 3:
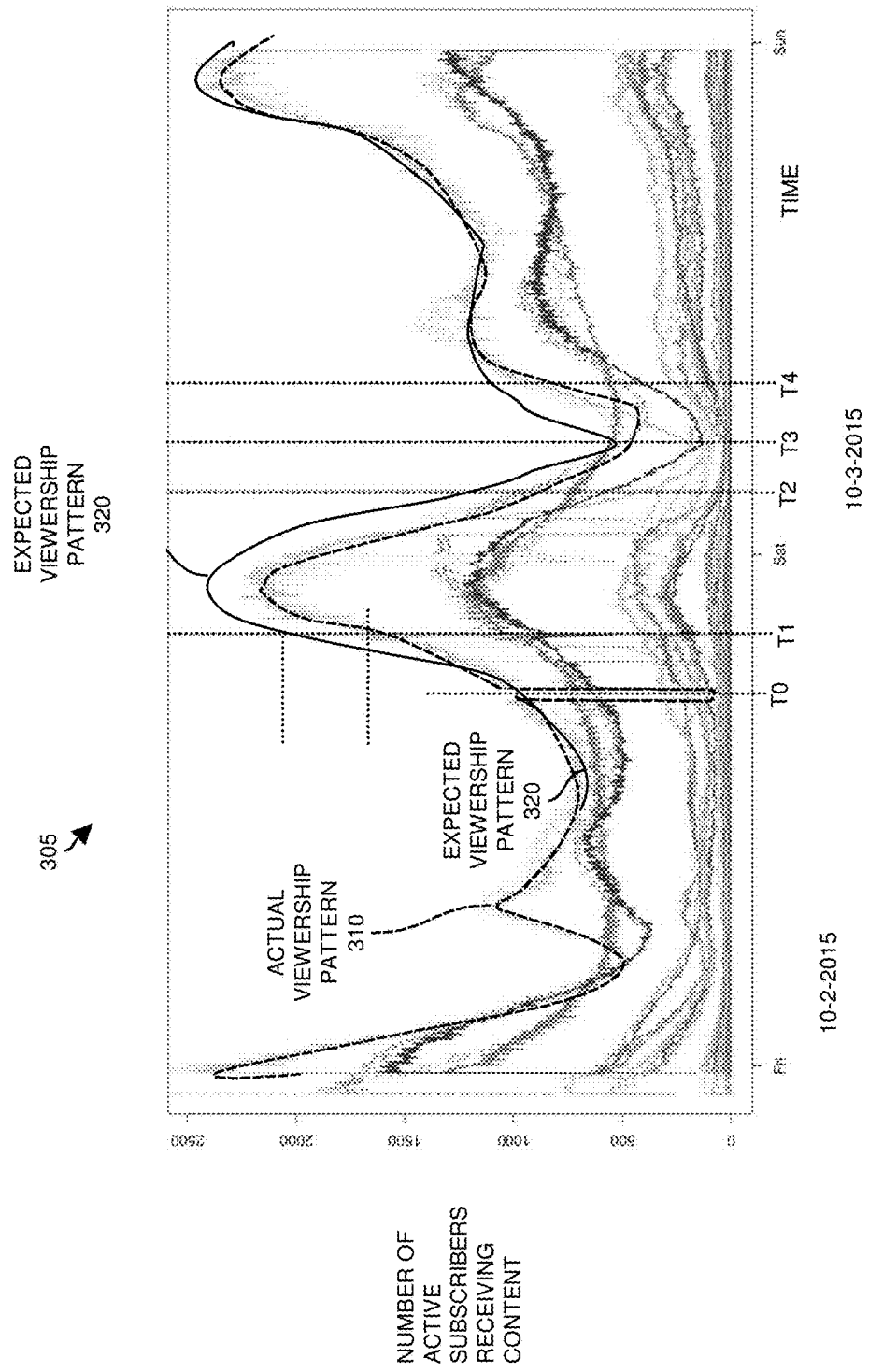
FIG. 3 is an example diagram illustrating analysis of feedback to identify anomaly conditions and generation of pattern information according to embodiments herein.

FIG. 3 is an example diagram illustrating analysis of feedback to identify anomaly conditions and generation of pattern information according to embodiments herein.

In this example embodiment, graph 305 displays feedback received from one or more resources disposed in network environment 100. The feedback in this example indicates the number of active subscribers receiving content in a particular geographical location over time such as between Thursday at 12 o'clock midnight and Saturday at 12 o'clock midnight.

The actual viewership trend 310 displayed in graph 305 represents, as derived from appropriate feedback, a variation in the number of actual viewers receiving content over time for a particular type of content playback device.

As previously discussed, the data analyzer engine 140 has access to records of historical trends of multiple playback devices to use as a baseline to determine whether or not an anomaly condition occurs. In this example embodiment, the data analyzer engine 140 uses historical feedback (in which there were no detected errors) as a baseline to generate expected viewership trend 320 (expected pattern of the number of viewers actively receiving content).

In this example embodiment, assume that the data analyzer engine accesses previously recorded historical trends of the number of active subscribers receiving content for one or more prior weeks. For example, graph 305 illustrates a trend of the number of active subscribers receiving content on Oct. 2, 2015 (Friday) through Oct. 3, 2015 (Saturday). In one embodiment, the data analyzer engine 140 derives the expectation of viewership trend 320 based upon the number of active subscribers receiving content in the same geographical region being monitored and from the same monitored set of resources on same corresponding days of prior weeks such as between Sep. 25, 2015 (Friday) through Sep. 26, 2015 (Saturday); between Sep. 18, 2015 (Friday) through Sep. 19, 2015 (Saturday); between Sep. 11, 2015 (Friday) through Sep. 12, 2015 (Saturday); between Sep. 4, 2015 (Friday) through Sep. 5, 2015 (Saturday); etc.

Accordingly, detecting occurrence of a pattern of an anomaly condition associated with a first set of one or more resources includes comparing the current feedback from the multiple resources to prior (normal) feedback received from the first set of one or more resources.

Assuming that there are no reasons for unusual deviations with respect to viewership from week to week for a given day, it is expected that the number of active subscribers receiving content between Friday and Sunday as shown in FIG. 3 is relatively the same over the course of a given day of the week compared to prior past weeks at the same time of the corresponding day. Accordingly, in this example embodiment, via appropriate modeling, the data analyzer engine 140 derives the expected viewership pattern 320 from one or more weeks of prior actual viewership trends.

As further shown, the data analyzer engine 140 compares the actual viewership pattern 310 (based upon current receives feedback) to the expected viewership trend 320 (as derived from prior feedback).

At least some amount of deviation maybe expected from week to week between the current feedback and the prior feedback. However, at some point, when the actual viewership trend 310 (actual pattern of current feedback) deviates significantly and substantially (such as greater than 5% for at least a predetermined amount of time, such as greater than 10% for at least a predetermined amount of time, such as greater than 15% for a predetermined amount of time, etc.)

with respect to the expected viewership pattern 320, the data analyzer engine 140 initiates generation of a respective alert indicating occurrence of the anomaly condition.

In this particular example, at or around time T1, the data analyzer engine 140 detects a substantial deviation of the actual viewership trend 310 (based on the currently received feedback information indicating the number of active subscribers receiving content in a particular geographical location) with respect to the expected viewership trend 320. Based upon a deviation of the actual viewership pattern 310 and the expected viewership pattern 320, the data analyzer engine 140 detects that the anomaly condition occurs between time T1 and T4.

In this instance, the anomaly condition is detected well before time T2, at which time the outage of a particular one or more resources is manually detected (such as without any alerts) by maintenance personnel overseeing network environment 100 and corresponding network resources providing feedback 155 indicating the actual viewership pattern 310. In other words, the data analyzer engine 140 and corresponding algorithm detect an outage of one or more respective resources a few hours in advance of possible human detection without any alerts. Accordingly, in one embodiment, the data analyzer engine 140 detects the anomaly condition well before (such as several hours before) maintenance personnel at or around time T2 would otherwise detect the anomaly and corresponding root failure in the network environment 100.

In one embodiment, the data analyzer engine 140 provides notification to one or more appropriate entities of the possible anomaly as detected at time T1. In response to receiving notification of the possible anomaly, the corresponding appropriate entities such as technicians proactively investigate the anomaly and identify the particular type of root failure causing the occurrence of the anomaly condition associated with a monitored first set of one or more resources in network environment 100.

In this instance, assume that the personnel detects that the outage (expected actual viewership pattern 310, which is lower than expected) is caused by an authentication server failure (such as failure of authentication server resource 228) in which new clients attempting to retrieve content are unable to do so because they cannot be properly authenticated by authentication server resource 228.

Note that certain clients may have been authenticated prior to time T1. However, these clients may need to be re-authenticated by the authentication server resource 228 every hour or so. In such an instance, part of the decreased or lower than expected actual viewership is indicated by actual viewership pattern 310 between T1 and T4 may be caused at least in part based upon the inability of the previously authenticated clients from being re-authenticated by the authentication server resource 228.

As previously discussed, according to further embodiments, in addition to producing and transmitting a respective anomaly condition alert at or around time T1, embodiments herein include dispatch or execution of one or more entities or resources such as maintenance personnel, diagnostic resources, etc., to identify a root cause of the respective identified anomaly condition detected at or around time T1 and occurring until approximately time T4.

Subsequent to identifying one or more root causes of the detected anomaly condition, an administrator (or other suitable entity) associates the detected anomaly condition to the detected anomaly pattern (such as the expected viewership pattern 320). Additionally, the administrator, or other suitable entity) associates the detected anomaly to corresponding corrective action is required to fix the underlying one or more root causes associated with the one or more network resource failures causing the inability of subscribers to retrieve content.

Figure 4:
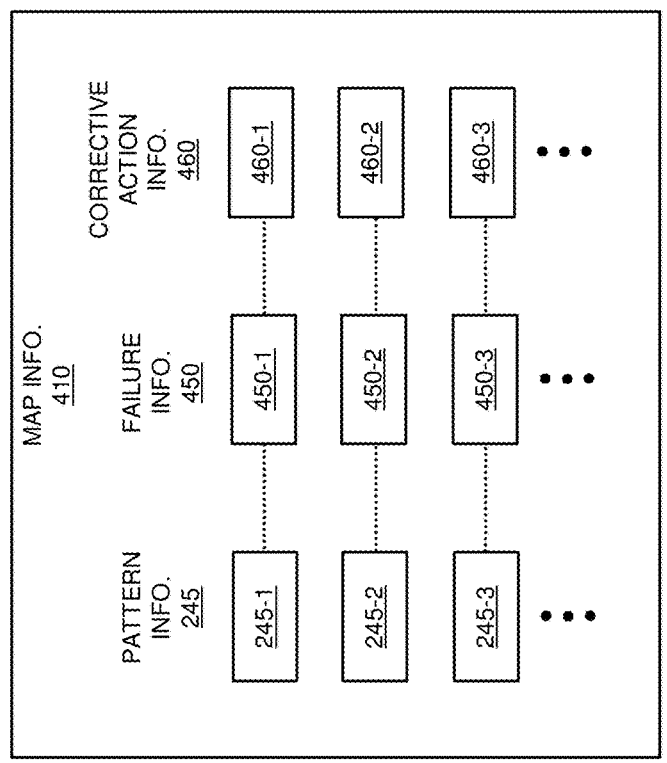
FIG. 4 is an example diagram illustrating mapping of pattern information to corresponding failure information and corrective action information according to embodiments herein.

FIG. 4 is an example diagram illustrating mapping of pattern information to corresponding failure information and corrective action information according to embodiments herein.

As further shown in this example, the data analyzer engine 140 produces the map information 410 mapping pattern information 245 of a particular detected anomaly to corresponding failure information 450 indicating a root cause of the corresponding detected anomaly condition. Additionally, the map information 410 maps the pattern information 245 and failure information 450 to corresponding corrective action information 460 indicating how to fix the root cause of the failure causing the detected anomaly condition.

In this example embodiment, assume that the data analyzer engine 140 detects first occurrence of the anomaly condition as previously discussed with respect to FIG. 3 based upon an analysis of the actual viewership pattern 310 with respect to the expected viewership pattern 320. In such an instance, subsequent to identifying the corresponding root cause of a failure associated with the detected anomaly condition between time T1 and T4, the data analyzer engine 140 (or other suitable resource) populates map information 410 in FIG. 4 to include i) the corresponding detected pattern (such as attributes, magnitudes, slopes, trends, duration information, filter information, threshold limit information, etc.) associated with the newly detected anomaly condition (such as resulting in a drop-off in the number of active subscribers receiving content), ii) corresponding failure information indicating the root cause of the anomaly condition, and iii) corresponding corrective action required to remedy the root cause of the failure.

Assume in this example embodiment, that the data analyzer engine 140 records the pattern information associated with the detected anomaly condition between time T1 and T4 as pattern information 245-1. Further, assume in this example embodiment, that the data analyzer engine 140 receives input (from technicians addressing the root failure) indicating a cause of the detected anomaly condition (as failure of authentication server resource 228). The data analyzer engine 140 stores the received input indicating the cause of the anomaly condition as failure information 450-1. The data analyzer engine 140 further receives information from the technicians indicating corrective action that was needed to fix the underlying root cause of the detected anomaly condition. The data analyzer engine 140 stores the received information regarding how to fix the problem as corrective action information 460-1.

As further shown, via pointers or other suitable mapping association technique, the data analyzer engine 140 associates the detected pattern information 245-1 (associated with the newly detected anomaly condition) to corresponding failure information 450-1 (indicating the root cause of the failure) and corresponding corrective action information 460-1 (indicating how to correct the underlying root cause of the anomaly condition).

For each of multiple different additional types of detected anomalies and corresponding fixes by maintenance personnel maintaining the resources in network environment 100, the data analyzer engine 140 populates the map information 410 to indicate i) pattern information associated with a newly detected anomaly, ii) failure information associated with the newly detected anomaly, and iii) corrective active information associated with the newly detected anomaly.

More specifically, as shown, in addition to storing the first entry of information including pattern information 245-1, failure information 450-1, and corrective action information 460-1; for a second detected anomaly condition, the data analyzer engine 140 stores pattern information 245-2, corresponding failure information 450-2, and corrective active in information 460-2; for a third detected anomaly condition, the data analyzer engine 140 stores pattern information 245-3, corresponding failure information 450-3, and corrective active in information 460-3; and so on.

As previously discussed, note again that the pattern information can include any suitable type of information. In one embodiment, the pattern information 245-1 indicates the type of feedback to which the one or more pattern parameters in the pattern information 245-1 pertain. For example, the pattern information 245-1 can include information indicating that the pattern information 245-1 pertains to feedback indicating the number of active subscribers receiving content in a particular geographical location. In certain instances, the pattern information 245-1 can indicate how time duration information and/or magnitude information of how different a current trend must be with respect to an expected trend in order to produce a respective alert regarding the anomaly.

Further, the pattern information 245-1 can be configured to disregard short-term spikes in viewership (such as at or around time T0 in FIG. 3) as being anomalies to prevent notification of minor anomalies that are not of particular interest because it is not certain or it is less certain whether they are a failure.

The data analyzer engine 140 applies the pattern information 245 to appropriate feedback received from the same or different set of resources that cause the corresponding pattern information to be included in map information 410. As previously discussed, the pattern information can be configured to indicate which of the different feedback and/or corresponding types of resources in network environment 100 to which the pattern applies.

Further in this example embodiment, assume that the data analyzer engine 140 utilizes the pattern 245-1 to identify a subsequent occurrence of the anomaly condition associated with network environment 100. For example, assume that the data analyzer engine 140 applies pattern information 245-1 pattern to newly received feedback such as from a second set of one or more resources in network environment 100. Recall that the original pattern information 245-1 is recorded in response to detecting occurrence of an anomaly and corresponding failure associated with a first set of one or more resources in network environment 100.

In response to detecting that attributes of the current feedback received from the second set of one or more resources matches, falls within, or is substantially similar to the pattern information 245-1, the data analyzer engine 140 initiates generation of a respective message indicating the detected anomaly condition.

More specifically, in one embodiment, in response to detecting the anomaly condition as indicated by pattern information 245-1, the data analyzer engine 140 maps the pattern information to 245-1 to failure information 450-1 and corrective action information 460-1. The data analyzer engine 140 forwards the generated notification to appropriate network personnel. The notification including the failure information 450-1, corrective action information 460-1, identification of identities of failing resources, etc., notifies appropriate network personnel (overseeing management of the second set of resources) of the occurrence of the anomaly condition associated with the second set of one or more resources in network environment 100 as well as notifies the network personnel of the likely (candidate) root cause of the failure as specified by the failure information 450-1 and appropriate corrective action as specified by corrective action information 460-1 needed to fix the underlying root cause associated with the newly detected anomaly.

In a similar manner, note that based upon received feedback from each of the multiple resources, the data analyzer engine 140 can be configured to identify occurrence of any number of one or more simultaneously or non-simultaneously occurring anomaly conditions (as captured and specified by pattern information 245) associated with each of the different resources in the communication path 260 in FIG. 2. In other words, multiple different anomaly conditions may occur for the same root cause failure.

Note further that different entities can be notified depending upon which of one or more different types of anomalies are detected.

Additionally, note that comparison of a previous pattern of feedback to a current pattern of feedback is shown by way of non-limiting example only. For example, in certain instances, pattern information associated with a corresponding underlying root cause may require detection of an anomaly condition associated with multiple different types of feedback. More specifically, pattern information associated with a corresponding underlying root cause may require detection of an anomaly (such as an encoder failure associated with encoder 220) as indicated by feedback 155-2 as well as a drop in actual content viewership as indicated by feedback 155-5 receives from this distribution resource 125. In response to detecting occurrence of the multiple anomaly conditions, the data analyzer engine 140 generates an appropriate notification indicating that the likely root cause is encoder 220 based upon past experience that the root cause is likely a respective encoder in the communication path. In such an instance, drop-off of viewership is a result of the inability of the target devices 110-1 to decode and playback respective received content.

Figure 5:
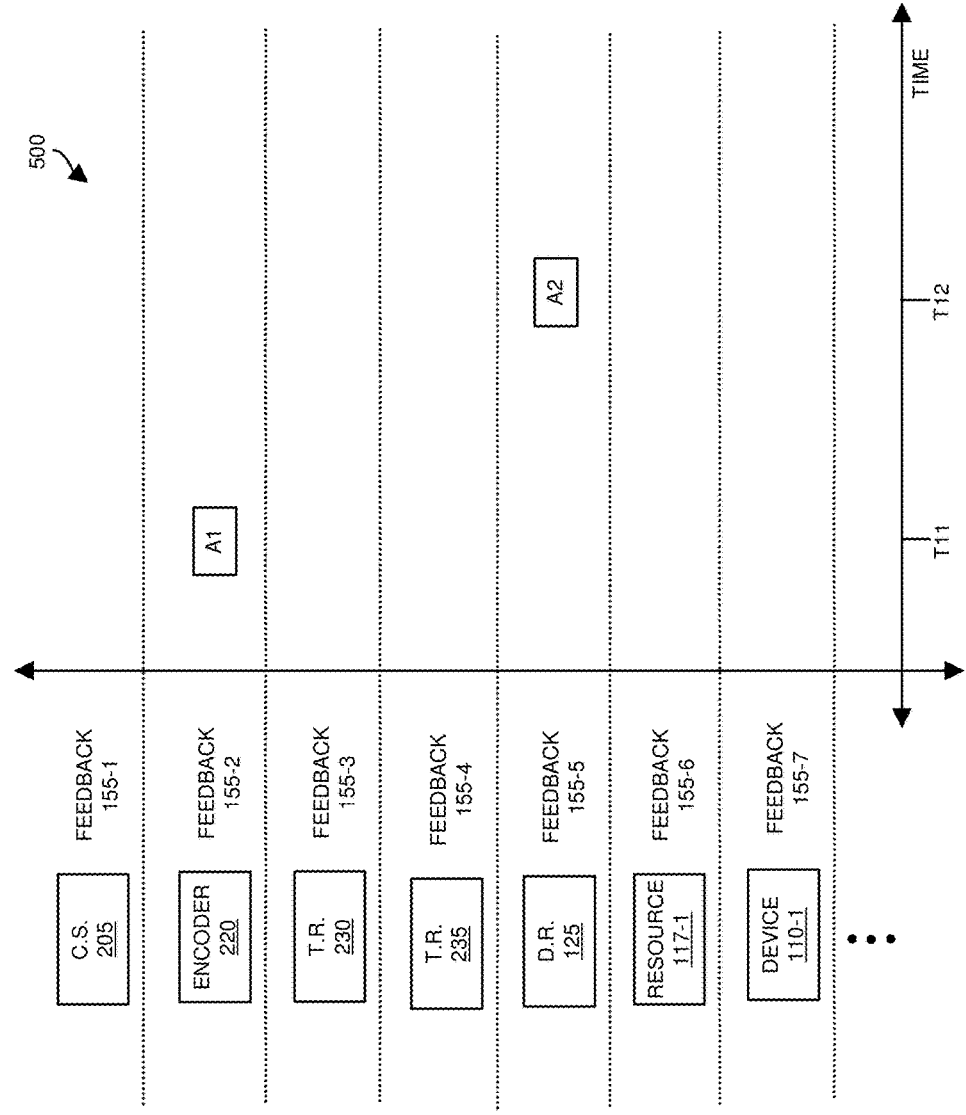
FIG. 5 is an example diagram illustrating detection of multiple anomalies based on analysis of corresponding feedback according to embodiments herein.

FIG. 5 is an example diagram illustrating detection of multiple anomalies based on received feedback according to embodiments herein.

As previously discussed, the data analyzer engine 140 can be configured to detect occurrence of an anomaly in any suitable manner such as by applying and comparing patterns 245-1, 245-2, 245-3, etc., to the appropriate newly received feedback 155. For example, pattern 245-1 pertains to number of active subscribers receiving content feedback 155-5 from distribution resource 125, pattern 245-2 can be configured to pertain to feedback 155-2 received from encoder 220; so on.

In this example embodiment, at or around time T11 in graph 500, assume that the data analyzer engine 140 compares the pattern 323 of previously learned pattern information 245 to the newly received feedback 155-2. Via application of previously learned pattern 323 to the newly received feedback 155-2, assume that the data analyzer engine 140 detects occurrence of anomaly condition A1 associated with feedback 155-2 from the encoder 220.

Occurrence of one anomaly condition (such as anomaly condition A1) may result in the occurrence of another anomaly condition (such as anomaly condition A2) in the network environment 100. Assume in this example that occurrence of the anomaly condition A1 (such as an encoder failure associated with respect to encoder 220) at or around time T11 is known by data analyzer engine 140 to eventually result in occurrence of another anomaly A2 at approximately time T12 due to past history of learning and recording of a relationship between anomaly condition type A1 and anomaly condition type A2.

In such an instance, the data analyzer engine 140 can be configured to detect occurrence of the second anomaly condition A2 in the network environment. The second anomaly condition A2 caused by and occurring subsequent to the first anomaly condition A1. In response to detecting that the first anomaly condition A1 and that the second anomaly condition A2 is merely related to and caused by the first anomaly condition A1 based on past feedback and resolution of anomalies, the data analyzer engine 140 can be configured or trained to prevent distribution of a notification to second network personnel regarding the second anomaly condition A2 so that the network the second network personnel does not needlessly try to fix a non-root cause associated with the second anomaly condition A2. Preventing the distribution of an alert notification regarding the anomaly A2 or filtering such an alert may be useful in certain embodiments because the second personnel does not attempt to troubleshoot the anomaly condition A2, which is known to be caused by anomaly condition A1 being troubleshooted or corrected by the first personnel, who are notified of the anomaly condition as well as corresponding root cause of the failure.

Accordingly, embodiments herein can include being proactive and providing notification of the occurrence of one or more anomalies such that the anomalies are addressed in an efficient manner.

More specifically, as shown, assume that the data analyzer engine 140 detects the anomaly A1 at or around time T11. In response to detecting the anomaly condition A1, the data analyzer engine 140 generates a respective notification of the anomaly condition A1 to first personnel assigned to manage and correct the first anomaly condition A1. Based on past history, and as captured by respective pattern information stored in the map information 410, the data analyzer engine 140 may know that the first anomaly condition A1 will eventually result in the occurrence of the second anomaly condition A2 at a later time T2.

In one embodiment, in addition to initiating a first notification to appropriate maintenance personnel regarding occurrence of the first anomaly condition A1 to first network personnel that provide corrective action to encoder 220, even before the anomaly condition A2 even occurs or is detected (i.e., before time T12), the data analyzer engine 140 can be configured to anticipate future occurrence of the anomaly condition A2 and initiate generation and transmission of a second notification (to second personnel who handle errors associated with distribution resource 125) indicating that the second anomaly condition A2 is about to (or may) occur and that the root cause of the anomaly condition A2 is likely or potentially related to the earlier detected anomaly condition A1, currently being corrected by first personnel.

Thus, in accordance with embodiments herein, the second personnel will be notified that the anomaly condition A2 will or may likely occur, but it will be known by the second personnel via the notification that there is no need to look into the anomaly condition to deeply because it is likely being fixed by the first personnel addressing anomaly condition A1, which is or will cause anomaly condition A2. Thus, in this non-limiting example embodiment, the notification provided to the second personnel will ensure that they are not surprised by the anomaly condition A2.

Figure 6:
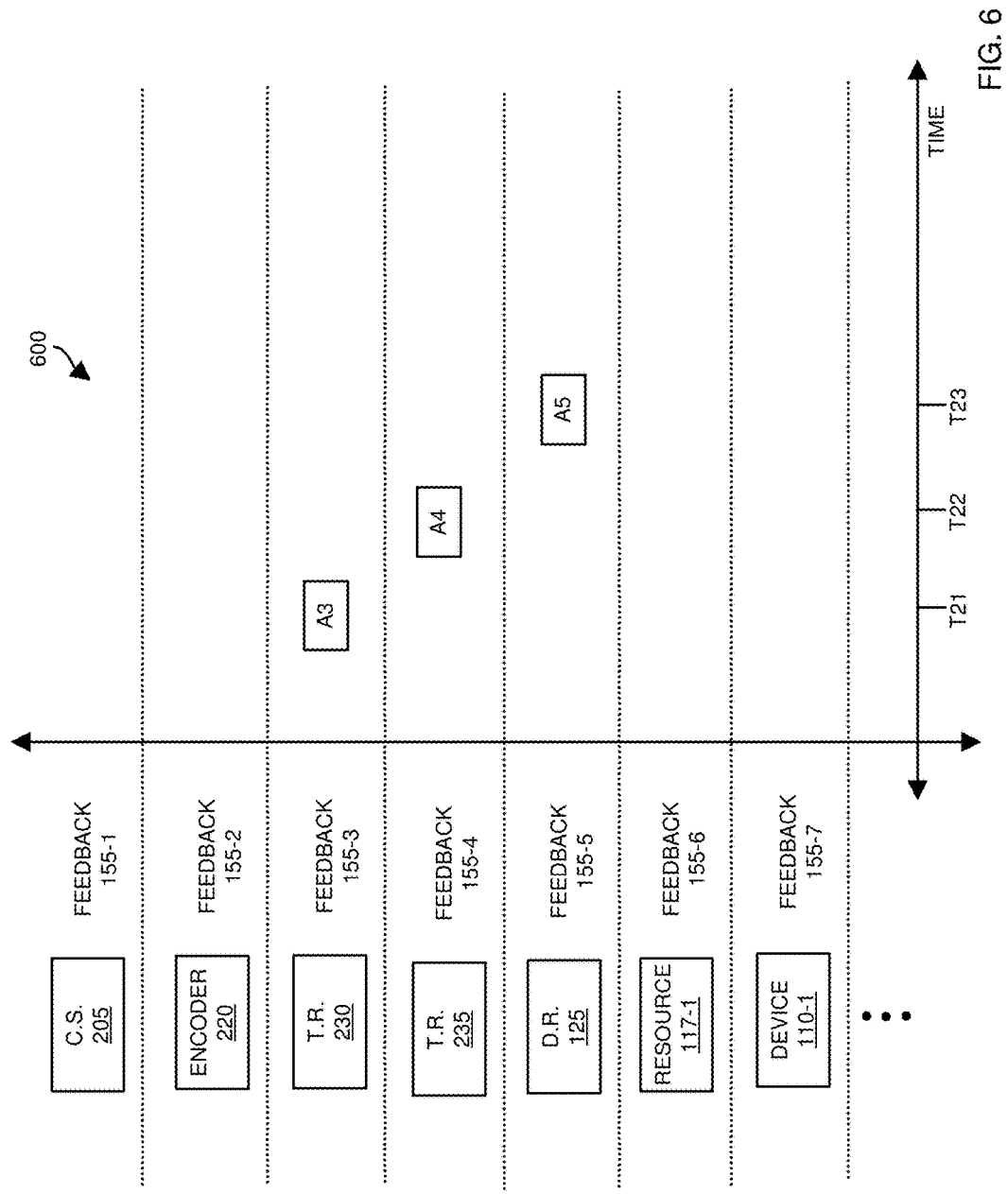
FIG. 6 is an example diagram illustrating detection of multiple anomalies based on analysis of corresponding feedback according to embodiments herein.

FIG. 6 is an example diagram illustrating detection of multiple anomalies based on analysis of corresponding feedback according to embodiments herein.

In this latter example embodiment, at time T21 in graph 600, assume that the data analyzer engine 140 receives feedback 155-4 indicating occurrence of anomaly condition A3 associated with transmitter resource 235. Assume further that the occurrence of the anomaly condition A3 causes anomaly condition A4 at time T22 and anomaly condition A5 at time T23.

In this example embodiment, the data analyzer engine 140 detects occurrence of anomaly A4 based on feedback 155-5 associated with distribution resource 125. Data analyzer engine 140 detects occurrence of anomaly condition A5 based upon feedback 155-6 associated with resource 117-1.

Assume further that the data analyzer engine 140 determines, via application of patterns and mapping information 410, that anomaly condition A3 associated with the transmitter resource 235 is the root cause associated with the grouping of anomaly conditions A3, A4, and A5. The data analyzer engine 140 can be configured to identify which of the anomalies is root cause in any suitable manner.

In one embodiment, via mapping information 410, the data analyzer engine 140 may know that the anomaly condition A3 is the root cause of subsequent anomaly conditions A4 and A5 because anomaly condition A3 occurs first in the communication path 260. That is, anomaly condition A4 and anomaly condition A5 occur at resources downstream with respect to the transmitter resource 235, experiencing anomaly condition A3.

Additionally or alternatively, the data analyzer engine 140 can be configured to determine that the anomaly condition A3 is the root cause of subsequent anomaly conditions A4 and A5 because anomaly condition A3 occurs first in time (i.e., at time T21) prior to time T22 and time T23.

In response to detecting the occurrence of the anomaly conditions A3, A4, and A5, the data analyzer engine 140 provides notification to appropriate personnel to provide corrective action associated with transmitter resource 235.

In a manner as previously discussed, the data analyzer engine 140 can be configured to prevent generating notification of anomaly conditions A4 and A5 associated with respective distribution resource 125 and resource 117-1. Alternatively, the data analyzer engine 140 can be configured to provide notification that the anomaly conditions A4 and A5 are caused by anomaly condition A3, and that the root cause (transmitter resource 235) of the anomaly conditions A3, A4, and A5 is already being corrected by other personnel assigned to manage respective transmit resource 235.

In one embodiment, generation and transmission of a one or more notifications 145 can further include: using mapping information 410, mapping occurrence of the detected anomaly condition to a failure of a particular resource of the multiple resources; and transmitting the notification to appropriate network personnel that maintain operation of the particular resource, the notification indicating the anomaly condition of the particular resource.

Accordingly, in response to detecting occurrence of an anomaly condition based upon received feedback, the notification resource 141 can be configured to transmit one or more notifications 145 of anomalies to any of one or more suitable entities assigned to correct or further analyze whether such anomalies require corrective intervention.

Figure 7:
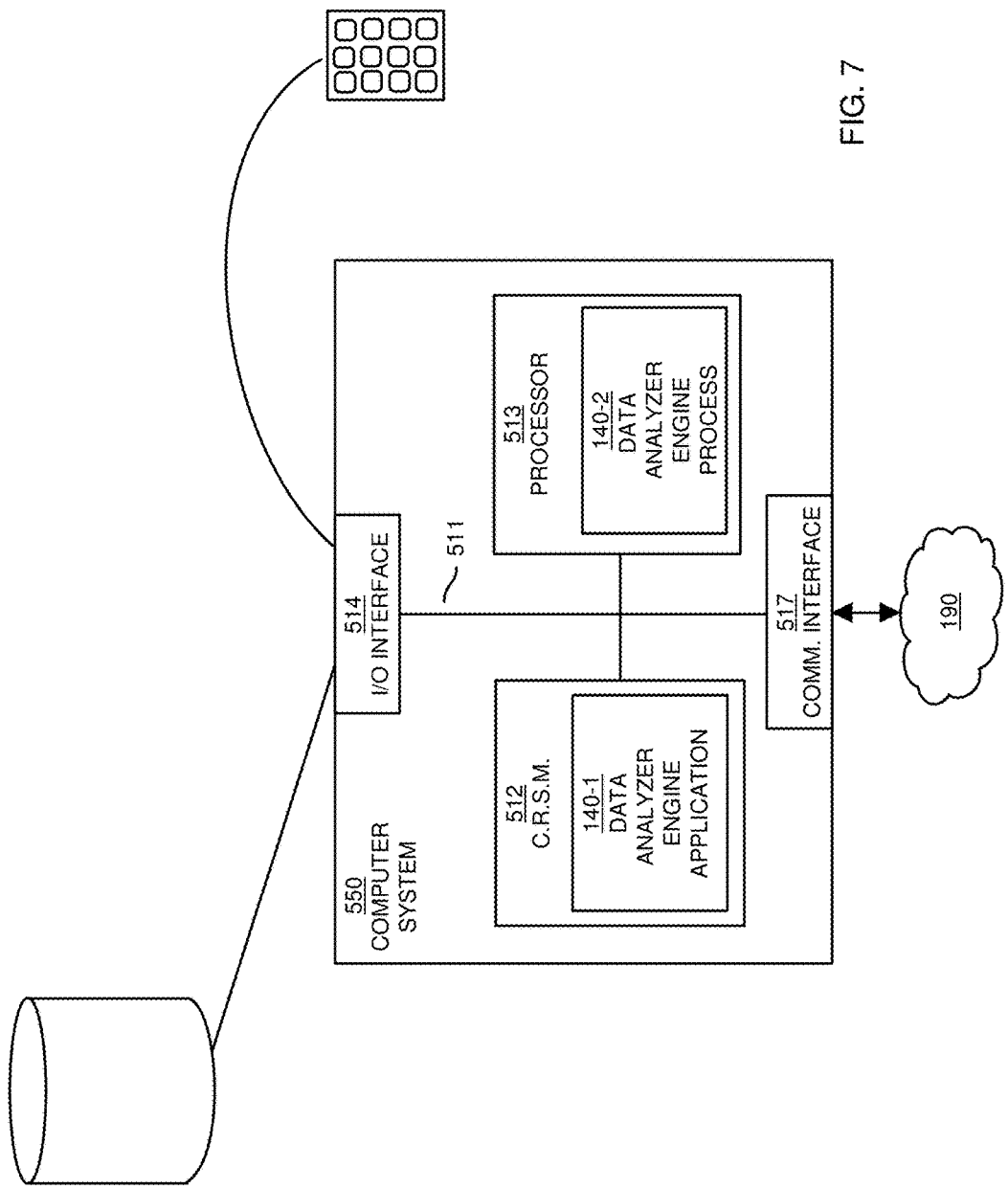
FIG. 7 is a diagram illustrating an example computer architecture in which to execute any of the functionality according to embodiments herein.

FIG. 7 is a diagram illustrating an example computer architecture in which to execute any of the functionality according to embodiments herein. Any of the different processing techniques can be implemented via execution of software code on a computer system.

For example, as shown, computer system 550 (e.g., a computer device) of the present example includes an interconnect 511 that couples computer readable storage media 512 such as a non-transitory type of media (i.e., any type of hardware storage medium) in which digital information can be stored and retrieved. The computer system 550 can further include processor resource 513 (i.e., computer processor hardware such as one or more co-located or disparately located processor hardware resources), I/O interface 514, communications interface 517, etc.

As its name suggests, I/O interface 514 provides connectivity to external resources such as storage devices, control devices, one or more display screens, etc.

Computer readable storage medium 512 can be any hardware storage device to store data such as memory, optical storage, hard drive, floppy disk, etc. In one embodiment, the computer readable storage medium 512 stores instructions and/or data.

Communications interface 517 enables the computer system 550 and processor resource 513 to communicate over a resource such as one or more networks 190. I/O interface 514 enables processor resource 513 to perform access data, control a respective display screen, receive input, etc.

As shown, computer readable storage media 512 can be encoded with data analyzer engine application 140-1 (e.g., software, firmware, etc.) executed by processor resource 513. Data analyzer engine application 140-1 can be configured to include instructions to implement any of the operations as discussed herein.

During operation of one embodiment, processor resource 513 accesses computer readable storage media 512 via the use of interconnect 511 in order to launch, run, execute, interpret or otherwise perform the instructions in data analyzer engine application 140-1 stored on computer readable storage medium 512.

Execution of the data analyzer engine application 140-1 produces processing functionality such as data analyzer engine process 140-2 in processor resource 513 (hardware). In other words, the data analyzer engine process 140-2 associated with processor resource 513 represents one or more aspects of executing data analyzer engine application 140-1 within or upon the processor resource 513 in the computer system 550.

Those skilled in the art will understand that the computer system 550 can include other processes and/or software and hardware components, such as an operating system that controls allocation and use of hardware resources to execute data analyzer engine application 140-1.

In accordance with different embodiments, note that computer system may be any of various types of devices, including, but not limited to, a set-top box, a mobile computer, a personal computer system, a wireless device, base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, etc., or in general any type of computing or electronic device.

The computer system 550 may reside at any location or multiple locations in network environment 100. The computer system 550 can be included in any suitable resource in network environment 100 to implement functionality as discussed herein.

Note that each of the other functions as discussed herein can be executed in a respective computer system based on execution of corresponding instructions.

Figure 8:
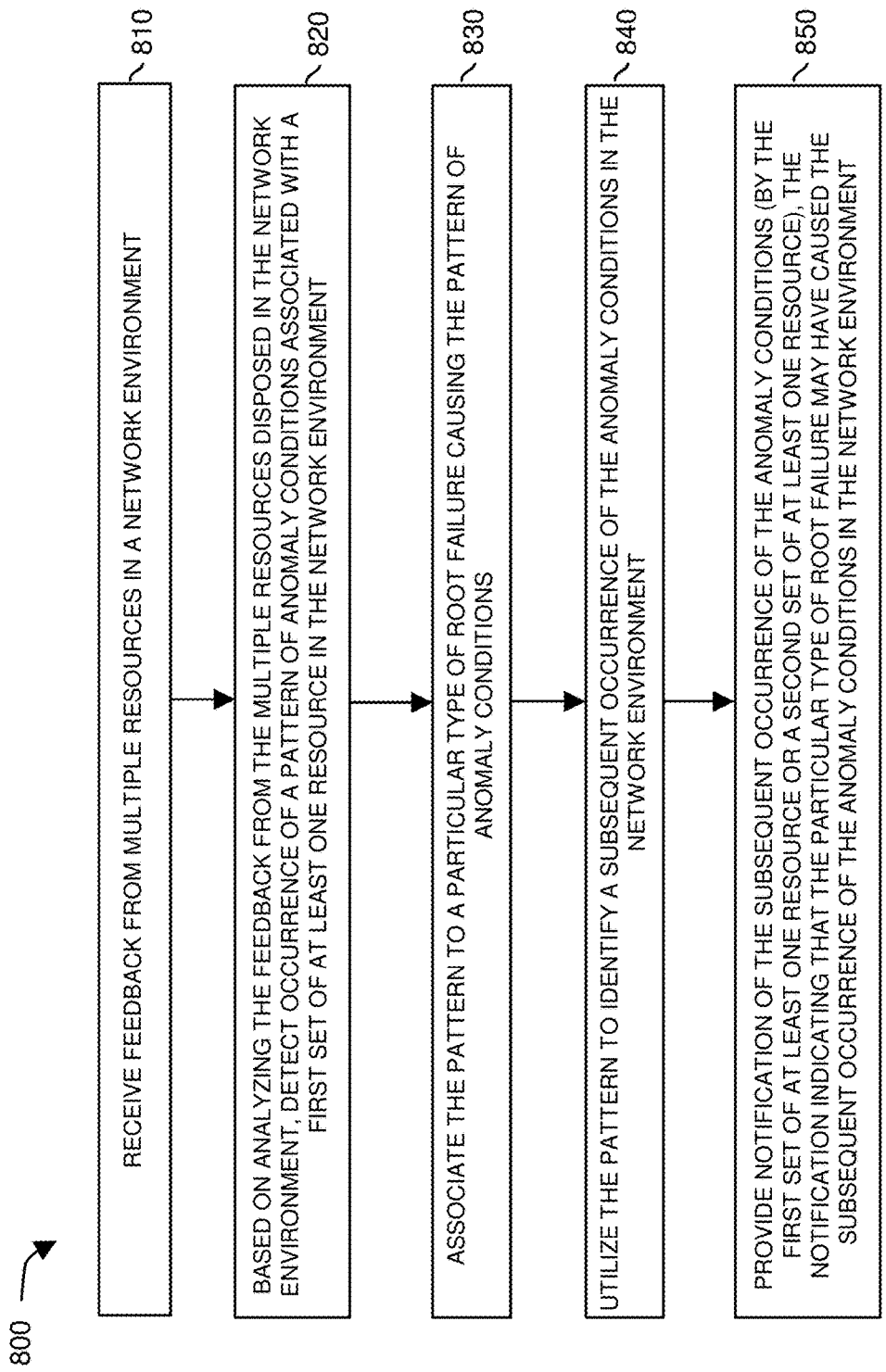
FIG. 8 is an example diagram illustrating a method according to embodiments herein.

FIG. 8 is a flowchart 800 illustrating an example method according to embodiments. Note that there will be some overlap with respect to concepts as discussed above. The processing in the flowcharts below can be executed in any suitable order.

In processing operation 810, the data analyzer engine 140 receives feedback 155 from multiple resources in a network environment 100.

In processing operation 820, based on analyzing the feedback from the multiple resources disposed in the network environment 100, the data analyzer engine 140 detects occurrence of a pattern of anomaly conditions associated with a first set of one or more resources in the network environment 100. As previously discussed, the data analyzer engine 140 can be configured to detect occurrence of an anomaly condition based upon detecting that current trending (or a pattern of current) feedback is substantially and/or statistically different than the corresponding pattern of normalized historical feedback.

In processing operation 830, the data analyzer engine 140 associates the detected pattern to a particular type of root failure causing the detected pattern of anomaly conditions.

In processing operation 840, the data analyzer engine 140 utilizes (applies) the previously detected patterns of anomaly conditions to newly received feedback to identify a subsequent occurrence of the anomaly conditions in the network environment 100.

In processing operation 850, the data analyzer engine 140 provides notification of the subsequent occurrence of the anomaly conditions (by the first set of one or more resources or a second set of one or more resources providing a similar function as the first set of one or more resources). In one embodiment, the data analyzer engine 140 produces the notification to indicate that the particular type of root failure may have caused the subsequent occurrence of the anomaly conditions in the network environment.

Note again that techniques herein are well suited for aiding in the identification of a root cause of a network anomaly to prevent or reduce the time of data delivery outages in a network environment. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
   via computer processor hardware, executing operations of:
      based on analyzing feedback from multiple resources disposed in a communication path of a network environment, detecting occurrence of a pattern of an anomaly condition associated with a first set of resources in the communication path, the multiple resources in the communication path collectively operated to provide a communication device access to content over the communication path;
      creating map information that maps the pattern of the anomaly condition associated with the first set of resources to a particular type of root failure causing the pattern of the anomaly condition detected in the communication path;
      utilizing the pattern to identify a subsequent occurrence of the anomaly condition in the network environment; and
      wherein the anomaly condition associated with the first set of resources is a condition in which a level of viewership of the content as retrieved by an existing set of clients over the communication path is lower than an expected level of viewership.

2. The method as in claim 1, wherein utilizing the pattern to identify the subsequent occurrence of the anomaly condition further comprises applying the pattern to newly received feedback, the method further comprising:
   via the map information, mapping the pattern identifying the subsequent occurrence of the anomaly condition to the particular type of root failure; and
   producing a notification indicating that the particular type of root failure caused the subsequent occurrence of the anomaly condition in the network environment.

3. The method as in claim 1 further comprising:
   recording the pattern in the map information in response to detecting occurrence of the pattern of the anomaly condition;
   applying the pattern to feedback from a second set of resources in the network environment;
   in response to detecting a substantial match of the pattern of the anomaly condition associated with the first set of resources to a pattern associated with feedback from the second set of resources, initiating generation of a notification indicating the subsequent occurrence of the anomaly condition; and
   wherein initiating generation of the notification further comprises: generating the notification to indicate that the particular type of root failure is a candidate cause of the subsequent occurrence of the anomaly condition associated with the second set of resources.

4. The method as in claim 1 further comprising:
   aggregating the feedback as real-time feedback from the multiple resources disposed in the network environment, the multiple resources collectively providing delivery of content to multiple subscribers in the network environment, the multiple resources disposed along the communication path in the network environment between content delivery sources and the multiple subscribers, the communication path providing communications between the content delivery sources and the multiple subscribers.

5. The method as in claim 1, wherein creating the map information further comprises:
   proactively identifying the particular type of root failure causing the occurrence of the anomaly condition in the first set of resources.

6. The method as in claim 1, wherein the feedback is current feedback;
   wherein detecting occurrence of the pattern of the anomaly condition associated with the first set of resources includes comparing the current feedback from the multiple resources to prior feedback received from the first set of resources; and
   wherein the current feedback and the prior feedback occur at a substantially same time of day, but are received on different days.

7. The method as in claim 1 further comprising:
   receiving input indicating the particular type of root failure causing the pattern of the anomaly condition associated with the first set of resources.

8. The method as in claim 1, wherein the level of viewership of the content as retrieved by the existing set of clients over the communication path is lower than the expected level of viewership due, at least in part, to an inability of the existing clients to be re-authenticated by an authentication server that controls delivery of the content over the communication path.

9. The method as in claim 1, wherein creating the map information includes:
   producing the map information to: i) map the pattern of the anomaly condition to corresponding failure information indicating the particular type of root failure, and ii) map the pattern to corresponding corrective action information indicating how to fix the root failure causing the subsequent occurrence of the anomaly condition in which subscribers are unable to retrieve the content over the communication path.

10. The method as in claim 1 further comprising:
receiving first feedback, the first feedback received from an encoder resource disposed in the communication path, the first feedback indicating a failure associated with the encoder resource;
receiving second feedback, the second feedback received from a distribution resource disposed in the communication path, the second feedback indicating a drop in distribution of content over the communication path; and
producing the pattern based on the first feedback and the second feedback, the particular type of root failure associated with the pattern being the failure associated with the encoder resource.

11. The method as in claim 1 further comprising:
providing notification to first network personnel of the subsequent occurrence of the anomaly condition in the network environment, the anomaly condition being a first anomaly condition;
detecting occurrence of a second anomaly condition in the network environment, the second anomaly condition caused by the first anomaly condition; and
in response to detecting that the second anomaly condition is related to and caused by the first anomaly condition, preventing distribution of a communication to second network personnel regarding the second anomaly condition.

12. The method as in claim 1, wherein the identified subsequent occurrence of the anomaly condition is not in itself a failure but indicates that a failure in network environment is about to occur.

13. The method as in claim 1, wherein the first set of resources in the communication path includes a first resource and a second resource;
wherein the feedback includes: i) first feedback received from the first resource, the first feedback indicating occurrence of a first anomaly associated with the first resource, and ii) second feedback received from the second resource, the second feedback indicating occurrence of a second anomaly associated with the second resource.

14. The method as in claim 13, wherein both the first resource and the second resource reside in the communication path.

15. The method as in claim 14, wherein the pattern includes the first anomaly and the second anomaly, the first anomaly detected as being a root cause of the second anomaly; and
wherein utilizing the pattern to identify a subsequent occurrence of the anomaly condition in the network environment includes:
providing notification to first personnel to correct a subsequent occurrence of the first anomaly; and
preventing notification to second personnel to correct a subsequent occurrence of the second anomaly because the map information indicates that the first anomaly is the root cause of the second anomaly.

16. A computer system comprising:
a hardware storage resource; and
computer processor hardware in communication with the hardware storage resource, the computer processor hardware executing a data analyzer engine operable to:
based on analyzing feedback from multiple resources disposed in a communication path of a network environment, detect occurrence of a pattern of an anomaly condition associated with a first set of resources in the communication path, the multiple resources in the communication path collectively operated to provide a communication device access to content over the communication path;
create map information that maps the pattern of the anomaly condition associated with the first set of resources to a particular type of root failure causing the pattern of the anomaly condition detected in the communication path;
utilize the pattern to identify a subsequent occurrence of the anomaly condition in the network environment; and
communicate an alert to maintenance personnel of the network environment, the alert indicating detection of the subsequent occurrence of the anomaly condition in the network environment; and
wherein the anomaly condition associated with the first set of resources is a condition in which a level of viewership of the content as retrieved by an existing set of clients over the communication path is lower than an expected level of viewership.

17. The computer system as in claim 16, wherein the data analyzer engine is further operable to:
apply the pattern to newly received feedback, the method further comprising:
map the pattern identifying the subsequent occurrence of the anomaly condition to the particular type of root failure; and
produce a notification indicating that the particular type of root failure may have caused the subsequent occurrence of the anomaly condition in the network environment.

18. The computer system as in claim 16, wherein the data analyzer engine is further operable to:
record the pattern in response to detecting occurrence of the pattern of the anomaly condition;
apply the pattern to feedback from a second set of resources in the network environment; and
in response to detecting a substantial match of the pattern of the anomaly condition associated with the first set of resources to a pattern associated with feedback from the second set of resources, initiate generation of a notification indicating the subsequent occurrence of the detected anomaly condition.

19. The computer system as in claim 18, wherein the data analyzer engine is further operable to:
generate the notification to indicate that the particular type of root failure is a candidate cause of the subsequent occurrence of the anomaly condition associated with the second set of resources.

20. The computer system as in claim 16, wherein the data analyzer engine is further operable to:
aggregate the feedback as real-time feedback from the multiple resources disposed in the network environment, the multiple resources collectively providing delivery of content to multiple subscribers in the network environment over the communication path, the multiple resources disposed in the communication path in the network environment between content delivery sources and the multiple subscribers, the communication path providing communications between the content delivery sources and the multiple subscribers.

21. The computer system as in claim 16, wherein the data analyzer engine is further operable to:
proactively identify the particular type of root failure causing the occurrence of the anomaly condition in the first set of resources.

22. Computer-readable hardware storage having instructions stored thereon, the instructions, when carried out by computer processor hardware, causing the computer processor hardware to perform operations of:

based on analyzing feedback from multiple resources disposed in a communication path of a network environment, detect occurrence of a pattern of an anomaly condition associated with a first set of resources in the communication path, the multiple resources in the communication path collectively operated to provide a communication device access to content over the communication path;

create map information that maps the pattern of the anomaly condition associated with the first set of resources to a particular type of root failure causing the pattern of the anomaly condition detected in the communication path;

utilize the pattern to identify a subsequent occurrence of the anomaly condition in the network environment; and wherein the anomaly condition associated with the first set of resources is a condition in which a level of viewership of the content as retrieved by an existing set of clients over the communication path is lower than an expected level of viewership.

23. The method as in claim 1 further comprising:

in response to detecting the subsequent occurrence of the anomaly condition based on the pattern, communicating an alert to maintenance personnel associated with the network environment, the alert indicating the subsequent occurrence of the anomaly condition in the network environment.

24. The method as in claim 23, wherein the anomaly condition is caused by an authentication server failure in which new clients are unable to retrieve the content over the communication path because the new clients cannot be properly authenticated by the authentication server.

25. The method as in claim 23, wherein the existing set of clients retrieving the respective content over the communication path are required to be re-authenticated over time in order to continue retrieving the content from a respective content source over the communication path.

26. A method comprising:

via computer processor hardware, executing operations of:

based on analyzing feedback from multiple resources disposed in a communication path of a network environment, detecting occurrence of a pattern of an anomaly condition associated with a first set of resources in the communication path, the multiple resources in the communication path collectively operated to provide a communication device access to content over the communication path;

creating map information that maps the pattern of the anomaly condition associated with the first set of resources to a particular type of root failure causing the pattern of the anomaly condition detected in the communication path; and utilizing the pattern to identify a subsequent occurrence of the anomaly condition in the network environment;

the method further comprising:

receiving first feedback, the first feedback received from a first resource in the communication path, the first feedback indicating a failure of the first resource;

receiving second feedback, the second feedback received from a second resource in the communication path, the second feedback indicating a degradation of distributing the content over the communication path from the first resource; and producing the map information based on the first feedback and the second feedback, the map information indicating that the particular type of root failure associated with the pattern is caused by the failure of the first resource.

27. A method comprising:

via computer processor hardware, executing operations of:

based on analyzing feedback from multiple resources disposed in a communication path of a network environment, detecting occurrence of a pattern of an anomaly condition associated with a first set of resources in the communication path, the multiple resources in the communication path collectively operated to provide a communication device access to content over the communication path;

creating map information that maps the pattern of the anomaly condition associated with the first set of resources to a particular type of root failure causing the pattern of the anomaly condition detected in the communication path; and utilizing the pattern to identify a subsequent occurrence of the anomaly condition in the network environment;

the method further comprising:

receiving first feedback, the first feedback received from a first resource in the communication path, the first feedback indicating a failure of the first resource;

receiving second feedback, the second feedback received from a second resource, the second resource disposed external to the communication path, the second resource controlling delivery of the content over the communication path; and producing the pattern based on the first feedback and the second feedback, the particular type of root failure identified as being a failure of the second resource, the failure of the second resource causing the failure of the first resource.

\* \* \* \* \*